United States Patent
Smith

(10) Patent No.: US 12,017,718 B2
(45) Date of Patent: Jun. 25, 2024

(54) ADJUSTABLE HEIGHT PIN FOR A TIE ROD

(71) Applicant: Shock Therapy Suspension, Inc., Duluth, GA (US)

(72) Inventor: Justin Smith, Phoenix, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 0 days.

(21) Appl. No.: 18/177,314

(22) Filed: Mar. 2, 2023

(65) Prior Publication Data
US 2023/0303164 A1    Sep. 28, 2023

Related U.S. Application Data

(60) Provisional application No. 63/322,312, filed on Mar. 22, 2022.

(51) Int. Cl.
*B62D 7/18*    (2006.01)
*B62D 7/16*    (2006.01)

(52) U.S. Cl.
CPC .............. *B62D 7/18* (2013.01); *B62D 7/16* (2013.01); *B62D 7/166* (2013.01)

(58) Field of Classification Search
CPC .......... B62D 7/18; B62D 7/166; B62D 7/163; B62D 7/16; B62D 7/228
See application file for complete search history.

(56) References Cited

U.S. PATENT DOCUMENTS

| | | | |
|---|---|---|---|
| 1,474,057 A * | 11/1923 | Pridemore | B62D 7/18 384/396 |
| 2,712,462 A * | 7/1955 | Latzen | B62D 7/16 403/53 |
| 4,534,575 A | 8/1985 | Grove | |
| 4,635,952 A * | 1/1987 | Smith | B62D 7/18 280/93.512 |
| 4,915,530 A * | 4/1990 | Tomlinson | B62D 7/18 403/162 |
| 6,047,789 A | 4/2000 | Iwanaga | |
| 6,071,032 A * | 6/2000 | Link | F16C 33/6622 403/119 |
| 6,402,169 B1 | 6/2002 | Schafer | |
| 6,470,991 B1 | 10/2002 | Bowman | |
| 6,767,022 B1 | 7/2004 | Chevalier | |

(Continued)

FOREIGN PATENT DOCUMENTS

CH    283965 A *    6/1952

OTHER PUBLICATIONS

EPO Machine Translation of Description of CH 283965 A, Anton, Jun. 30, 1952. (Year: 2023).*

*Primary Examiner* — Daniel D Yabut
(74) *Attorney, Agent, or Firm* — Schmeiser, Olsen & Watts LLP

(57) ABSTRACT

A wheel end assembly having upper and lower arms and a tie rod coupled to a wheel carrier at an outer tie rod joint. A pin member is disposed between upper and lower mounting extensions of the wheel carrier or extends from a single mounting extension. The pin member includes a first end, a second end and an expanded ball portion between the first and second end. The expanded ball portion is offset toward one of the first and second ends. The tie rod joint is defined by a pivotal coupling of the tie rod end to the pin member. An adjustable height pin for the tie rod allows adjust of height on the tie rod.

2 Claims, 12 Drawing Sheets

(56) References Cited

U.S. PATENT DOCUMENTS

| | | |
|---|---|---|
| 9,440,676 B1 | 9/2016 | Sparr |
| 9,709,087 B2 * | 7/2017 | Bucking ............. F16C 11/0695 |
| 2002/0127048 A1 * | 9/2002 | Schmidt ................ F16C 11/086 |
| | | 403/144 |
| 2003/0062701 A1 * | 4/2003 | Davis ....................... B60G 9/00 |
| | | 280/93.512 |
| 2005/0111907 A1 | 5/2005 | Urbach |
| 2007/0256659 A1 | 11/2007 | Anderson |
| 2008/0240847 A1 | 10/2008 | Crouse |

\* cited by examiner

ADJUSTABLE HEIGHT PIN FOR A TIE ROD

CROSS REFERENCE TO RELATED APPLICATION

This application claims priority to U.S. Provisional Patent Application Ser. No. 63/322,312, filed Mar. 22, 2022, which is related by subject matter to U.S. Pat. No. 9,988,803 to Justin Smith entitled "TIE ROD CONNECTION PIVOT ASSEMBLY," the disclosures of which are hereby incorporated entirely herein by reference.

BACKGROUND OF THE INVENTION

Technical Field

This invention relates generally to automotive equipment, and more specifically, to an adjustable height pin for a steering tie rod.

Description of the Related Art

In the evolution of the modern automobile, the proper handling characteristics of the vehicle have become increasingly more important. Automobile manufacturers attempt to design the suspension system to provide predictable steering input, while at the same time recognizing that production vehicles are used by a broad range of drivers. Also important to automobile manufacturers are cost, reliability and ease of repair. Thus, manufacturers of modern automobiles attempt to balance many factors in designing suspension systems, which often results in compromises in certain areas.

In recent years, all-terrain vehicles (ATVs) have gained widespread popularity. ATVs are commonly used in hunting, trail riding and utility applications such as the wide variety of maintenance activities which take place on a farm. Attachments are available for ATVs for use in utility applications such as plowing snow, mowing grass and hauling materials.

Perhaps the most common ATV application is trail riding. Trail riding on an ATV allows an ATV enthusiast to travel through areas which are not accessible by ordinary automobiles. Modern ATVs, can cover ground very rapidly and can cover great distances. Frequently, ATV enthusiasts ride their ATV for many hours straight and cover many miles. If the rider is subjected to excessive jarring while traveling over rough terrain, operator fatigue may result particularly during a long ride. During such long rides, an ATV may be used to carry a rider through a wide variety of terrain. Terrain which may be encountered includes forests, swamps, and deserts. Frequently ATVs are called upon to travel across rugged terrain at relatively high speeds.

Part of the thrill of riding an ATV is encountering challenging terrain, and through the performance of the ATV and the skill of the rider passing through the terrain. The ability to tackle challenging terrain may depend on the performance of the steering systems, suspension, and the interface between the rider and the ATV. These elements each affect the riding experience enjoyed by the ATV enthusiast.

Off road vehicles in the form of ATV's (all-terrain vehicles) and UTV's (utility task vehicles) are produced by numerous manufacturers. Purchasers and users of these vehicles frequently desire to fit them with larger tires to give them greater agility in traversing rough terrain. To fit larger tires on these vehicles, it is common to install a lift kit to raise the vehicle body to make room for the larger tires and to increase ground clearance. Typically, a lift kit will adversely affect constant velocity (CV) joint angles and necessitate replacement of the original equipment axles, including CV joints. Even with these upgrades, steering geometry can be compromised and bump steer, for example, can be introduced. Still further, the final drive ratio measured as available force at the thread surface of the oversize tires is reduced in proportion to the size increase. The foregoing reveals a need for an aftermarket system to mount oversize wheels on off road vehicles that avoids the disadvantage of ordinary lift kits.

The factory set-up for a conventional steering joint includes a large bump steer which contributes to the vehicle being unstable, hard to drive and with a large amount of rough feedback in the steering wheel when driving off road.

Thus, the need exists to provide a cost-effective system that reduces bump steer without dramatically altering the OE steering system.

SUMMARY OF THE INVENTION

It is an object of this invention to provide a steering assembly with an offset pivot point on the spindle to reduce bump steer, and specifically, a pivotal coupling is provided between the tie rod end and the wheel carrier pin member wherein an expanded ball portion of the pin member is offset from center to align the tie rod and the upper and lower control arms to be substantially parallel.

Further, a method is provided of coupling a wheel end assembly to a vehicle frame to improve bump steer of a vehicle, comprising the steps of providing a vehicle frame and a wheel carrier coupled to said vehicle frame by a suspension, wherein the suspension includes at least one upper arm and at least one lower arm. A tie rod is provided comprising an elongated body member and a tie rod end. A pin member is coupled to at least one mounting extension on the wheel carrier, wherein the pin member comprising a first end, a second end and an expanded ball portion between the first and second end. The expanded ball portion is offset toward one of the first and second ends of the pin member to substantially align the tie rod with the upper and lower arm in a substantially parallel position to thereby reduce bump steer. The tie rod is coupled to the wheel carrier at an outer tie rod joint by inserting the pin member through the tie rod end, whereby the tie rod joint is defined by a pivotal coupling between the tie rod end and the expanded ball portion, such that a pivot point of the pivotal coupling is offset toward one of the first and second end of the pin member.

Still further a tie rod connection assembly is provided comprising: a tie rod; a tie rod mount; a washer; a threaded nut; a pin member affixed to the tie rod mount and pivotally coupled to the tie rod, said pin member comprising a first end, a second end and a frustoconical shoulder portion between said first and second ends; and at least one spacer. The tie rod assembly may comprise multiple spacers.

A method of adjusting height on a tie rod is also provided comprising: unscrewing a threaded nut of a tie rod assembly, the tie rod assembly having a tie rod; a tie rod mount; a washer; the threaded nut; a pin member affixed to the tie rod mount and pivotally coupled to the tie rod, said pin member comprising a first end, a second end and a frustoconical shoulder portion between said first and second ends; and at least one spacer positioned below the tie rod mount; removing the washer and the at least one spacer to remove the pin member from the tie rod mount; placing the at least one spacer onto the pin member; moving the at least one spacer axially along the pin member to about the frustoconical shoulder portion, wherein the at least one spacer is positioned above the tie rod mount; inserting the pin member with the at least one spacer into the tie rod mount; and securing the pin within the tie rod mount with the washer and the threaded nut. The method may comprise multiple spacers.

These and other features of the present invention will be apparent from the following detailed description and accompanying drawings.

BRIEF DESCRIPTION OF THE DRAWINGS

A preferred embodiment of the invention will now be described by way of example with reference to the accompanying drawings. Although several embodiments of the invention are described and shown in the following description, like reference numbers identify like parts in each of the figures, in which.

DESCRIPTION OF THE PREFERRED EMBODIMENT

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Bump steer or roll steer is the term for the tendency of the wheel of a car to steer itself as it moves through the suspension stroke. It is typically measured in degrees of steer per meter of upwards motion or degrees per foot.

On modern cars the front suspension and steering links are designed so that during a turning maneuver, body roll and suspension motions will not influence the car to turn more sharply than the driver anticipates. On modern cars, the leading edge of the front tires move outwards as the suspension is compressed, and inwards as the suspension droops (extends). This is known as "toe out" under bump and results in roll understeer. During a turn, body roll will cause the outside suspension (relative to the curve) to compress and the inside suspension to droop (extend).

Bump steer causes a vehicle to turn itself when one wheel hits a bump or falls down into a hole or rut. Excessive bump steer increases tire wear and makes the vehicle more difficult to handle on rough roads. For example, if the front left wheel rolls over a bump it will compress the suspension on that corner and automatically rotate to the left (toe out), causing the car to turn itself left momentarily without any input from the steering wheel. Another example is when most vehicles become airborne their front wheels will noticeably toe in. Typical values are from two to ten degrees per meter, for the front wheels.

The linearity of the bump steer curve is important and relies on the relationship of the control arms and tie rod pickup points, and the length of each part. As the suspension goes through bump and droop, each part follows an arc resulting in a change of effective length. Whichever parts are longest end to have less change in effective length because their arc radius is longer. This is the determining factor in designed bump steer. Another factor that affects bump steer is bushing compliance and deflection and arm bending. During a turn, if some or all of the bushings deflect then their pickup points have changed. If any of the arms and tie rods bend, then their effective length will change resulting in a change of toe.

Figure 1:
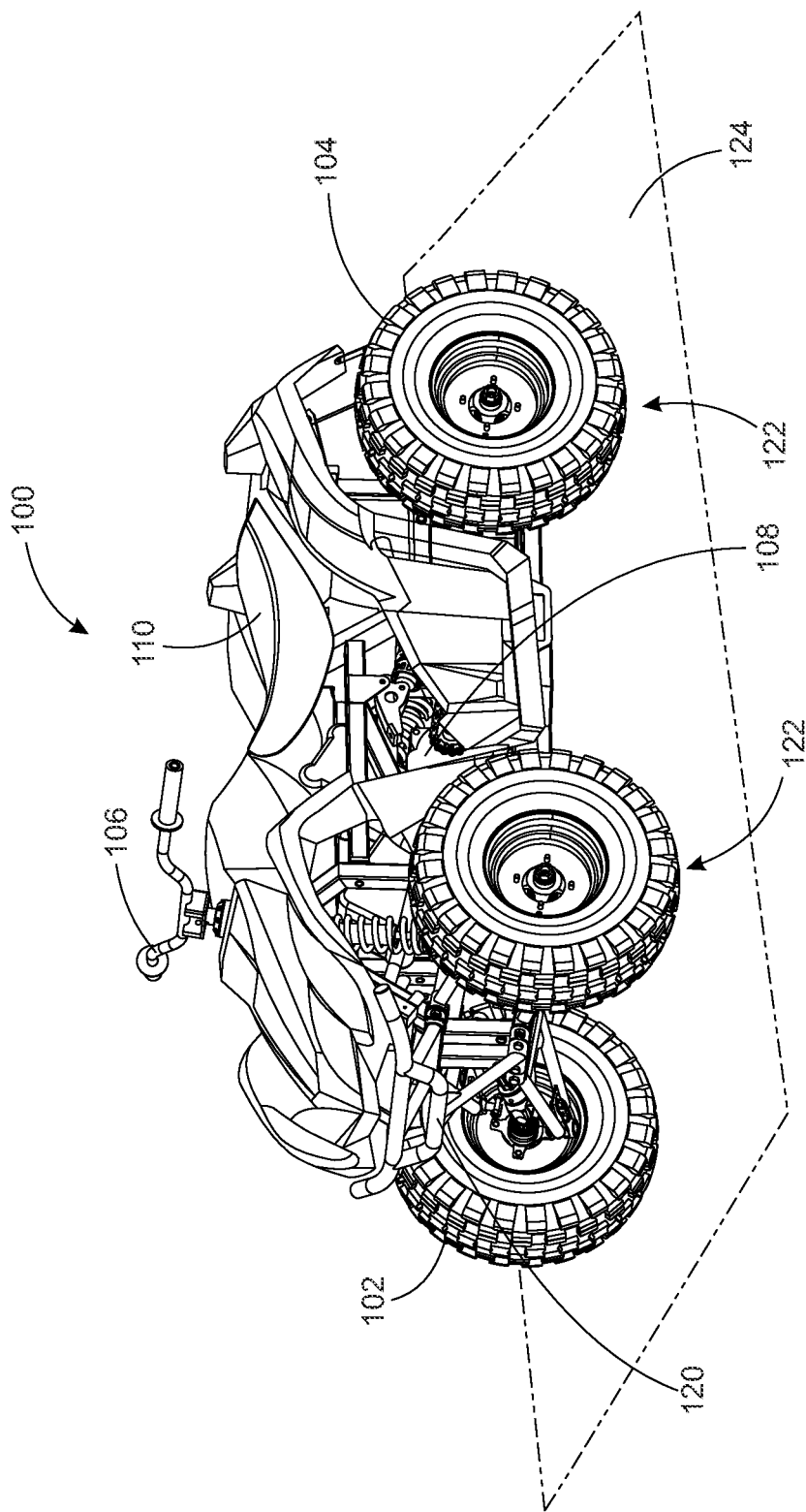
FIG. 1 is a perspective view of an ATV in accordance with the present invention.

FIG. 1 is a perspective view of an ATV 100 in accordance with the present invention. ATV 100 includes two front wheels 102 and two rear wheels 104. A set of handle bars 106 are coupled to the front wheels 102 for steering the ATV 100. An engine 108 is typically used to power the rear wheels 104, and in some cases also the front wheels 102. ATV 100 also includes a straddle-type seat 110 and foot rests for use by a rider of the ATV. In the embodiment of FIG. 1, engine 108 and seat 110 are both preferably coupled to a frame 120 of the ATV 100. Each of the front wheels 102 and rear wheels have a momentary ground contact point 122. The momentary ground contact points 122 of the wheels define a wheel contact plane 124. In the embodiment of FIG. 1, each of the front wheels 102 is coupled to frame 120 by a front suspension and each of the rear wheels 104 is coupled to frame 120 by a rear suspension.

Figure 2:
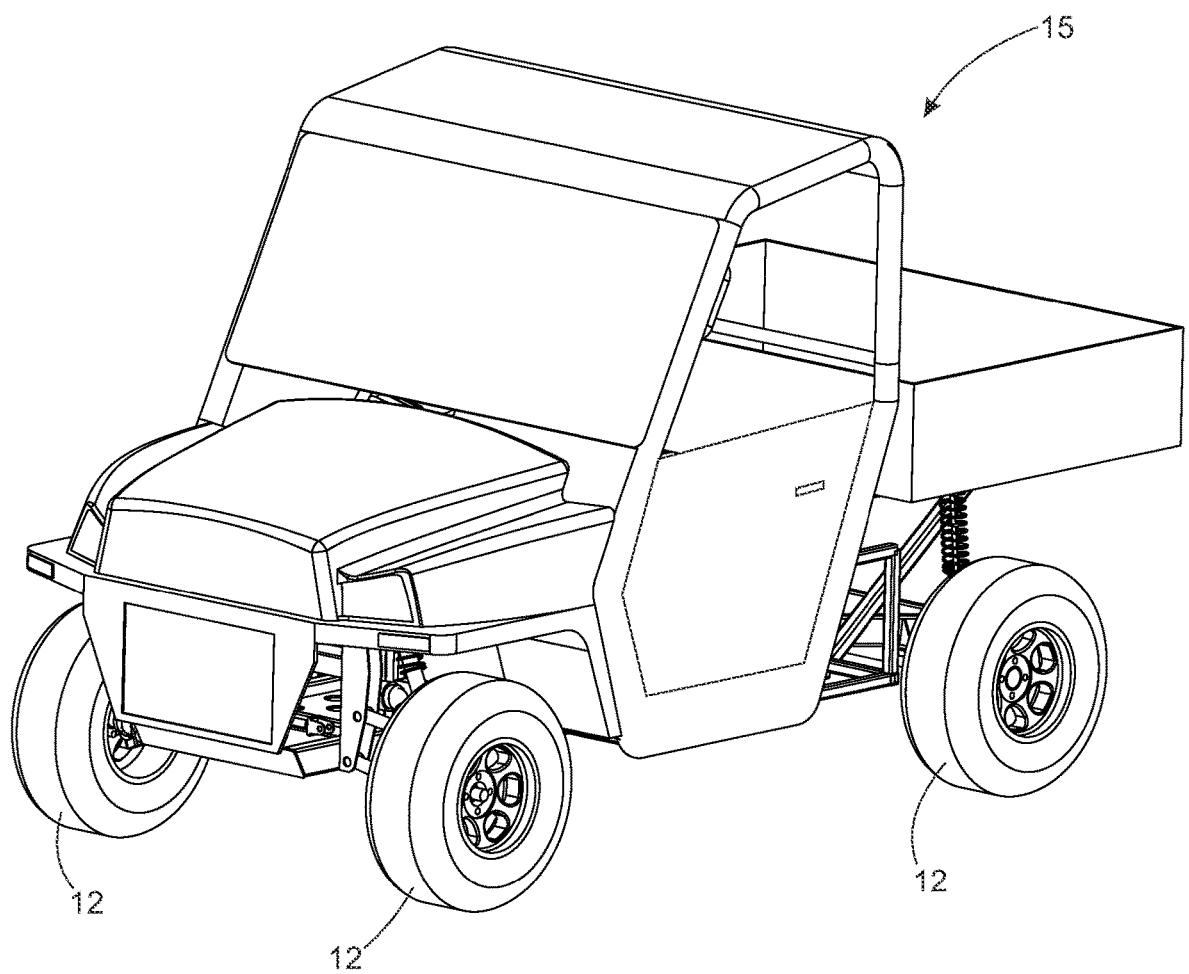
FIG. 2 is a perspective view of an ATV in accordance with the present invention.

FIG. 2 is a perspective view of an UTV 15 with wheels 12. This invention is equally applicable to both ATVs and UTVs as will be described below.

Figure 3:
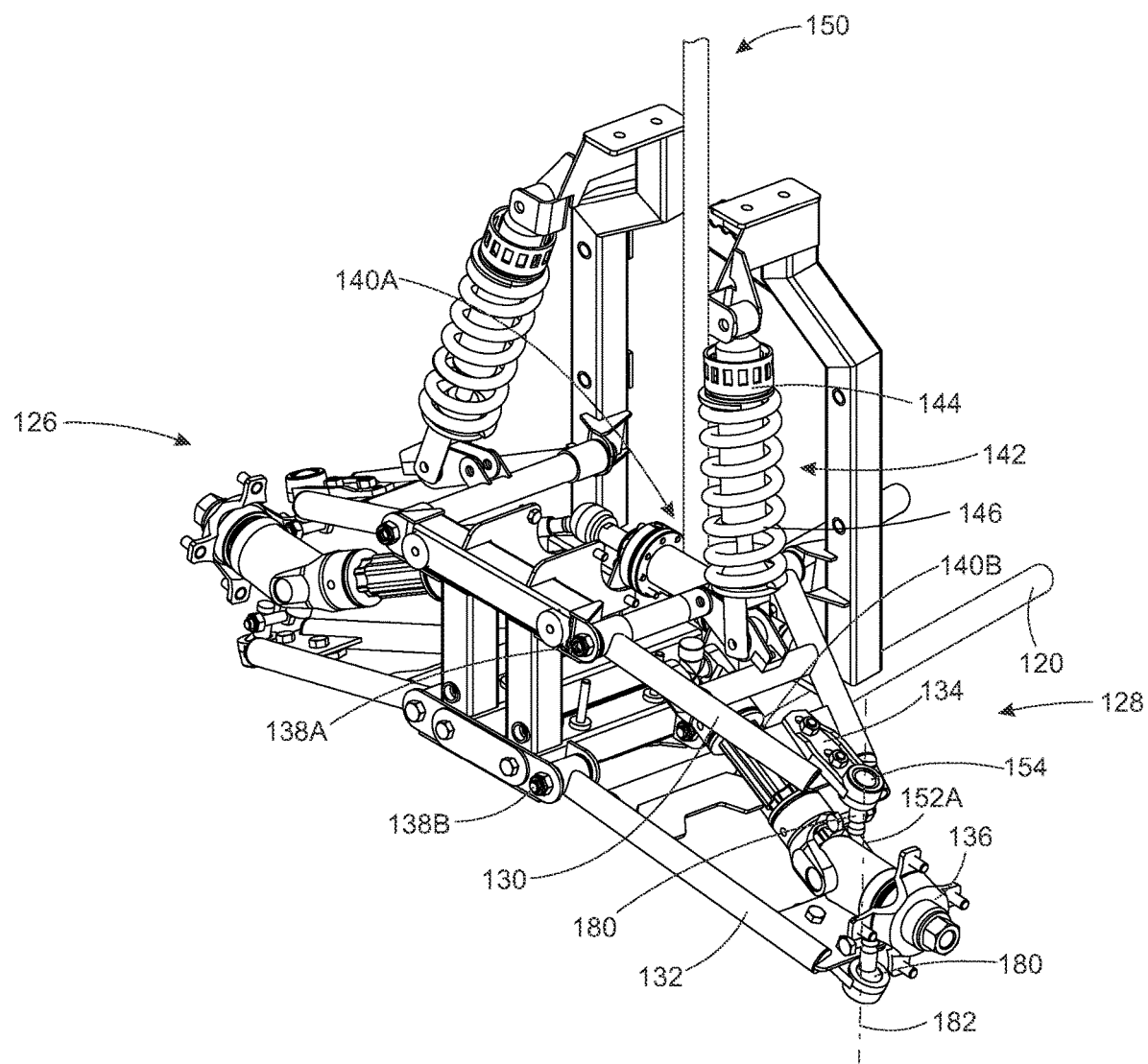
FIG. 3 is a perspective view of an assembly in accordance with an exemplary embodiment of the present invention.

FIG. 3 is a perspective view of an assembly 126 in accordance with an exemplary embodiment of the present invention. Assembly 126 includes a frame 120, and a suspension 128 comprising an upper arm 130, and a lower arm 132. In the embodiment of FIG. 2, upper arm 130 is rotatably coupled to frame 120 at a first joint 138A and a second joint 140A. Also, in the embodiment of FIG. 3, lower arm 132 is rotatably coupled to frame 120 at a first joint 138B and a second joint 140B.

Suspension 128 also includes a wheel carrier 134 that is coupled to upper arm 130 and lower arm 132. In the exemplary embodiment of FIG. 3, an outer end of upper arm 130 is coupled to an upper portion of wheel carrier 134. Also, in the exemplary embodiment of FIG. 2, an outer end of lower arm 132 is coupled to a lower portion of wheel carrier 134. A hub 136 is preferably rotatably coupled to wheel carrier 134.

In the embodiment of FIG. 3, upper arm 130 and lower arm 132 are coupled to wheel carrier 134 by ball joints 180. Ball joints 180 preferably provide three rotational degrees of freedom. The rotational degrees of freedom provided by ball joints 180 allow suspension 128 to move between a full compression position and a full extension provision and at the same time allow wheel carrier 134 to rotate about a steering axis 182.

Assembly 126 also comprises a steering system that is configured to rotate wheel carrier 134 about steering axis 182. Steering system 148 includes a steering column 150 and a left tie rod 152A. An outer end of left tie rod 152A is pivotally coupled to a protrusion 154 of wheel carrier 134. Steering column 150 is preferably rotatably supported by frame 120. A pair of handle bars or steering wheel (not shown) may be fixed to steering column 150 proximate a distal end thereof.

Suspension 128 also includes a spring assembly 142 having a first end rotatably coupled to frame 120 and a second end rotatably coupled to lower arm 132. In the embodiment of FIG. 3, spring assembly 142 includes a shock absorber 144 and a spring 146 that is disposed about shock absorber 144.

Figure 4:
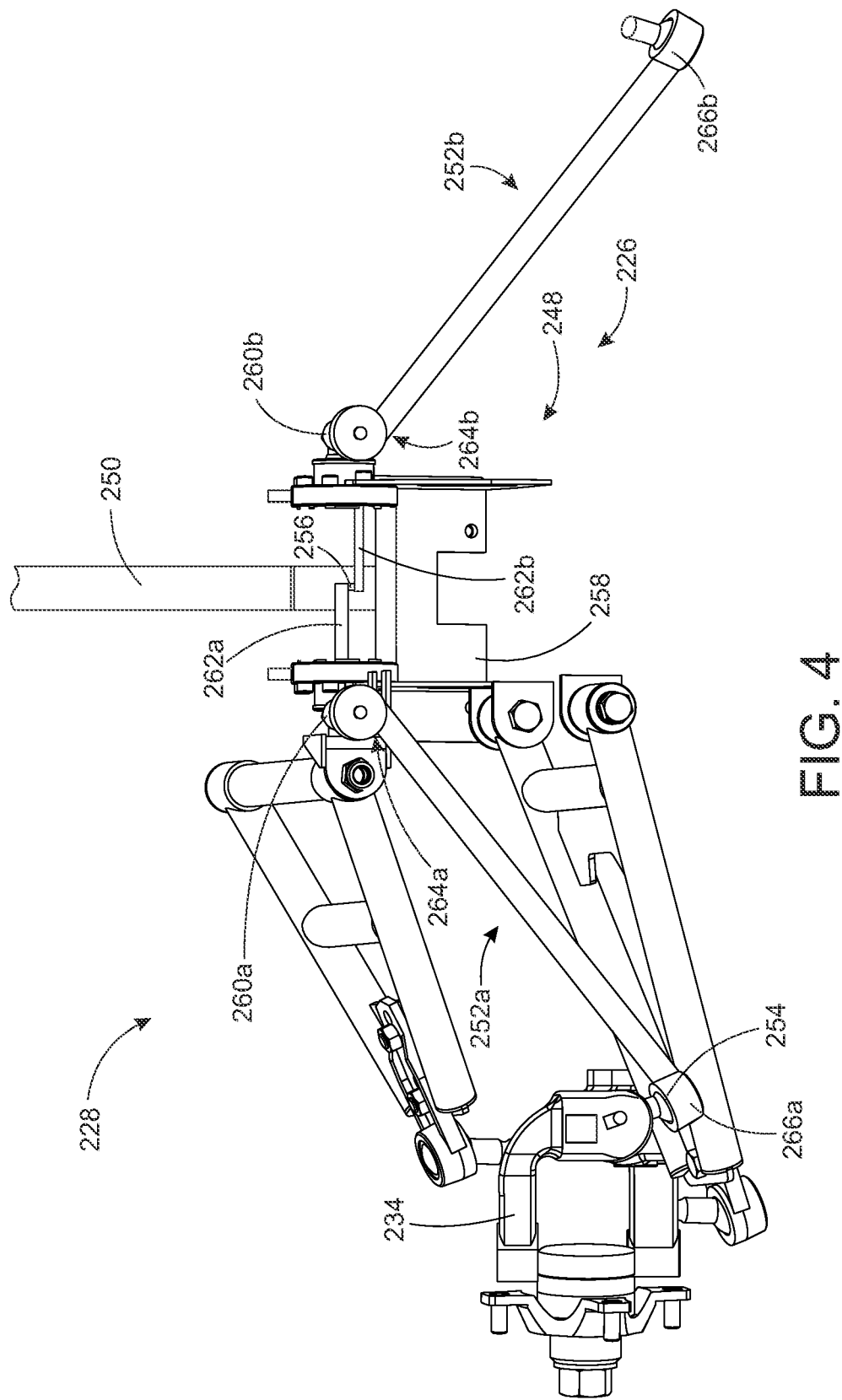
FIG. 4 is a perspective view of an assembly in accordance with the present invention.

FIG. 4 is a perspective view of an assembly in accordance with the present invention. Assembly comprises a steering system 248 including a steering column 250. In FIG. 4 it may be appreciated that a steering arm 256 is fixed to steering column 250 proximate a proximal end thereof. In some applications, a pair of handle bars or a steering wheel may be fixed to steering column 250 proximate a distal end thereof.

In the embodiment of FIG. 4, the proximal end of steering column 250 is rotatably supported by a mounting bracket 258. Mounting bracket 258 also rotatably supports a left intermediate arm 260A and a right intermediate arm 260B. Left intermediate arm 260A is coupled to steering arm 256 by a left link 262A, and right intermediate arm 260B is coupled to steering arm 256 by a right link 262B.

Steering system 248 also includes a left tie rod 252A and a right tie rod 252B. Left tie rod 252A includes an inner joint 264A and an outer joint 266A. In FIG. 3 it may be appreciated that left tie rod 252A is pivotally coupled to a protrusion or extension 254 of a wheel carrier 234 (i.e., single shear example of wheel carrier) at outer joint 266. In FIG. 3 it may also be appreciated that left tie rod 252A is pivotally coupled to left intermediate arm 260A at inner joint 264A.

Right tie rod 252B includes an inner joint 264B and an outer joint 266B. In FIG. 4 it may be appreciated that right tie rod 252B is pivotally coupled to right intermediate arm 260B at inner joint 264B. Right tie rod 252B is preferably also coupled to a right wheel carrier (not shown in FIG. 4) at outer joint 266B. Inner joints 264A, 264B and outer joints 266A, 266B preferably provide three rotational degrees of freedom. In the embodiment of FIG. 2, inner joints 264A, 264B and outer joints 266A, 266B comprise ball joints.

Figure 5:
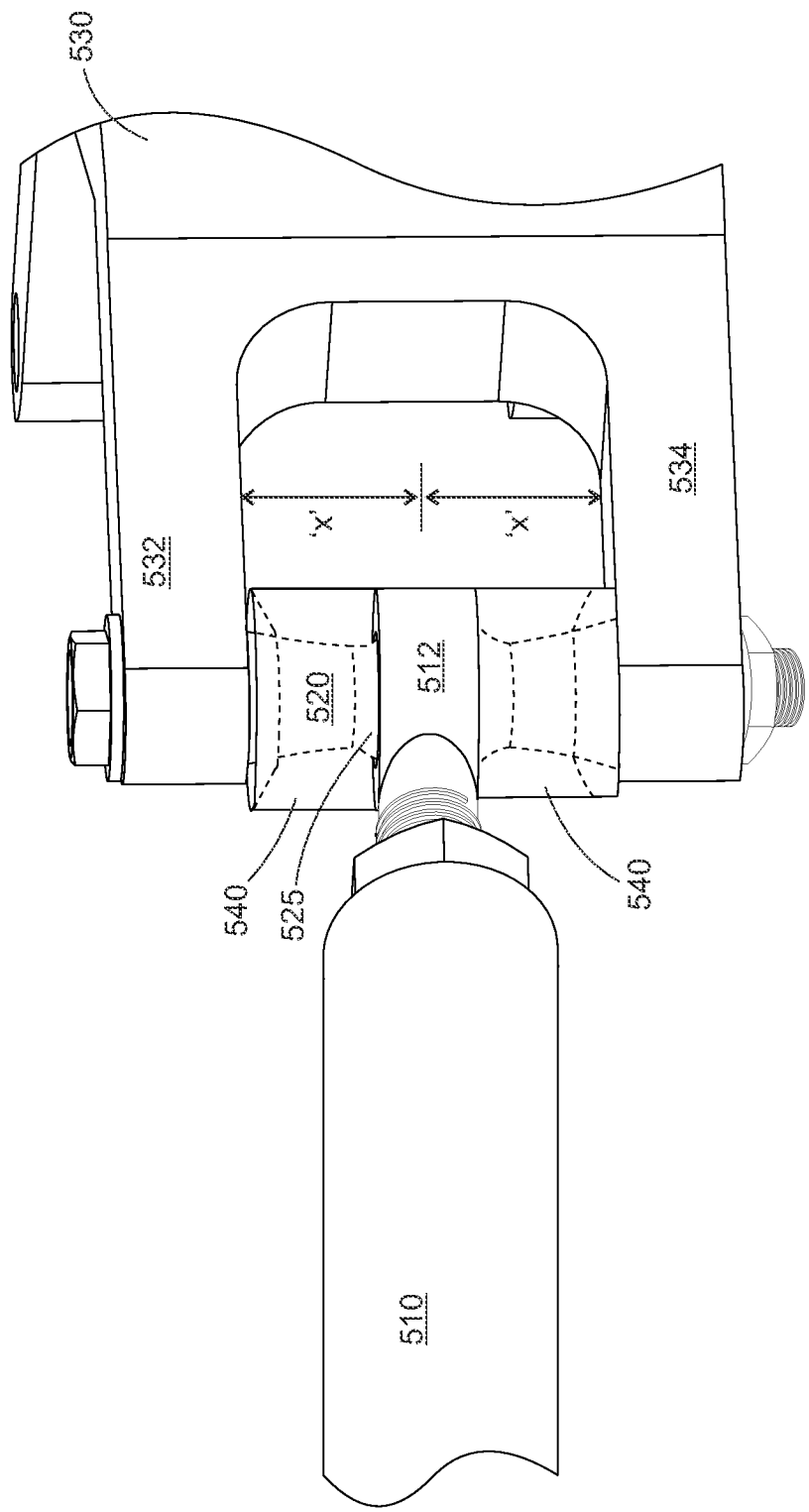
FIG. 5 illustrates a conventional tie rod connection assembly.

FIG. 5 illustrates a conventional joint/ball joint on the steering mechanism of a UTV. The tie rod 510 is pivotally connected at the tie rod end 512 to the pin 520 mounted to the double-sheer type carrier having an upper extension 532 and lower extension 534 integrally formed as part of the wheel carrier 530. Rubber grommets 540 may be provided to protect the joint from dirt, dust and debris. The conventional joint is on the end of the steering tie rod and is a connection point from the steering rack and pinion to the outer spindle where the ball portion 525 of the pin is disposed at the midpoint of the pin 520; e.g., the distances "x" are equal. In other words, the ball portion 525 o the pin 520 is disposed at a midpoint between the upper extension 532 and the lower extension 524 of the wheel carrier 530. In the conventional set up, there is a large amount of bump steer, which means that as the suspension cycles up and down going over bumps, rocks, jumps, etc., the toe setting changes dramatically. Typical alignments are 0.125-0.250" toe in; that is the front of the tires is closer to each other than the rear of the tires so the car tracks straight. Typical changes in toe setting (bump steer) for an off road car are under an inch. This conventional arrangement has 4 inches of bump steer. This large bump steer contributes to the car being unstable, hard to drive and a lot of rough feedback in the steering wheel when driving off road.

Figure 6:
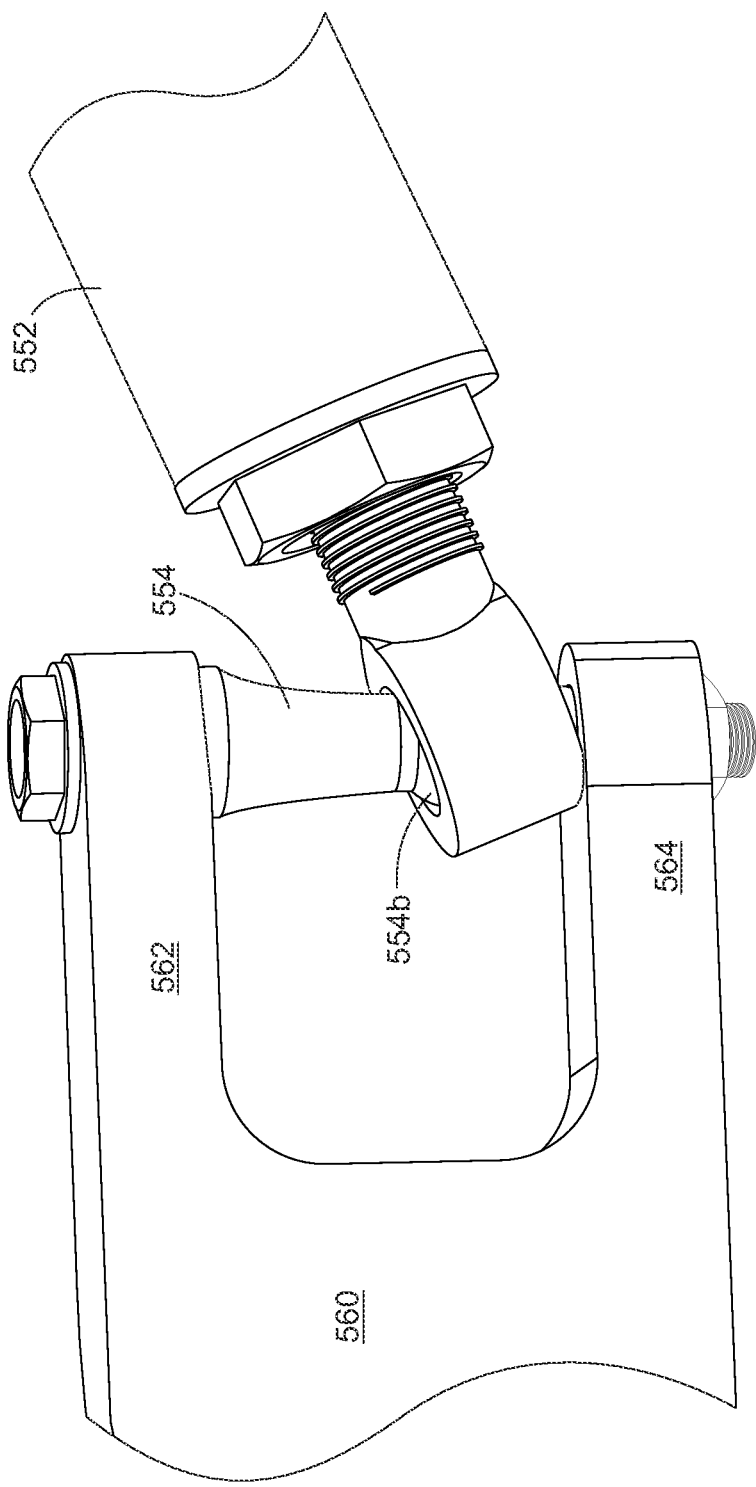
FIG. 6 is a side and top perspective view of the wheel end assembly according to the preset invention.

With reference to FIG. 6, the present invention will focus on the pivoting connection section where the tie rod is coupled to the wheel carrier; e.g., where the left tie rod 252A is pivotally coupled to a protrusion 254 of a wheel carrier 234 at outer joint 266 shown in FIG. 4. As shown in FIG. 6, the tie rod 552 connects to the pin 554 at a point that is substantially lower than the conventional arrangement of FIG. 5 in an effort to place the tie rod as well as the support arms (shown as 130, 132 in FIG. 3) in a substantially parallel position; i.e., substantially parallel with each other. In the arrangement of FIG. 6, the pin member 554 is formed with a neck portion 554a that is elongated above the ball portion 554b as shown in FIG. 7, and the pivot point has been lowered to a point where the terminal end of the tie rod 552 will actually contact the lower extension 564 when the tie rod 552 is pivoted to its maximum angle of travel.

However, the arrangement shown in FIG. 6 is only one preferred arrangement envisioned by the present invention and confirmed through actual use in the field. For example, the ball portion 554b may be raised to be offset in the vertical direction to be closer to the upper extension 562 in some wheel end designs to make the tie rod more parallel with the upper and lower support arms (see control arms 130, 132 in FIG. 3). Alternatively, the inner connection point of the tie rod may be likewise adjusted to align the tie rod with the upper and lower control or support arms in a parallel arrangement.

Thus, according to the preferred embodiment of the invention, it is envisioned that the upper arm, the lower arm and the tie rod should be positioned as close to parallel as possible. This arrangement keeps all three moving parts traveling on the same radius or arc as they travel up and down over bumps. If these suspension components are on different arcs, then bump steer is created. On the one system (e.g., an X3 system), it was discovered that the tie rod arc was higher than the upper and lower arms. By lowering the pivot point in the manner shown in FIG. 6, it was discovered that as the tie rod was moved closer to parallel the bump steer issue was reduced or eliminated. According to the invention, specific tests are run to calculate the optimal pivot point for the tie rod and the outer joint to fix bump steer as much as possible.

Figure 7:
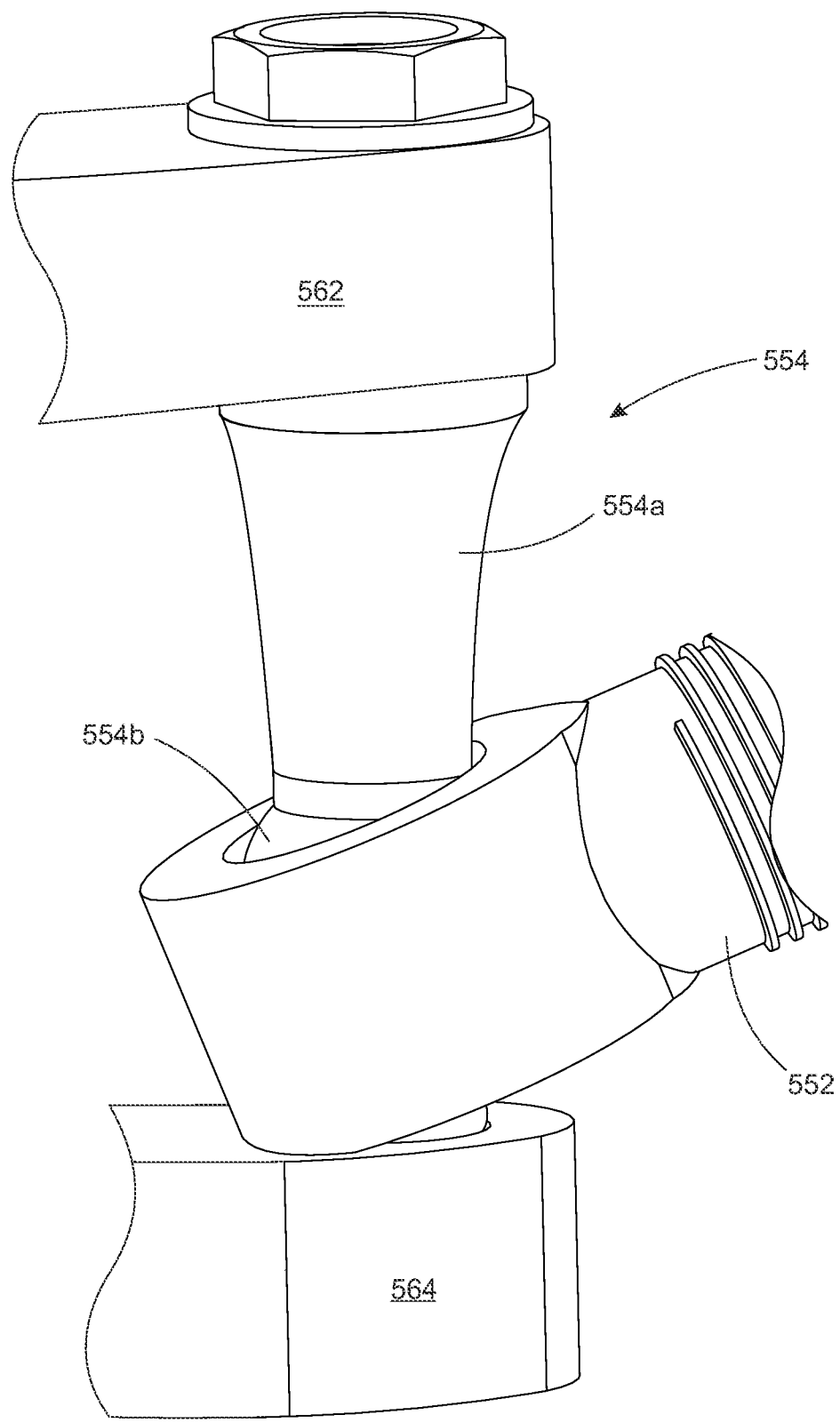
FIG. 7 is an enlarged partial view of the tie rod connection of FIG. 6 showing the tie rod end mating with the pin member affixed to the wheel carrier.

FIGS. 6 and 7 illustrate a double-shear wheel carrier 560 (i.e., having upper and lower mounting extensions 562, 564) where the ball portion 554b of the pin 554 is lowered toward the lower mounting extension 564 of the double-shear wheel carrier 560.

As shown in FIGS. 6 and 7, the bump steer is reduced dramatically by lowering the pivot point on the spindle by an amount shown by the difference between FIG. 5 and FIGS.

6 and 7. This change in pivot point or lowering of the ball portion 554b in this example gets the front end geometry from a poor 4 inches of bump steer to under half an inch. The tie rod/joint connection of FIGS. 6 and 7 provides a steering assembly that is more drivable and allows the vehicle to drive straight when the operator wants. The arrangement of FIGS. 6 and 7 has no negative feedback in the steering wheel and the limited stress, and the arrangement saves front end parts as well.

Figure 8:
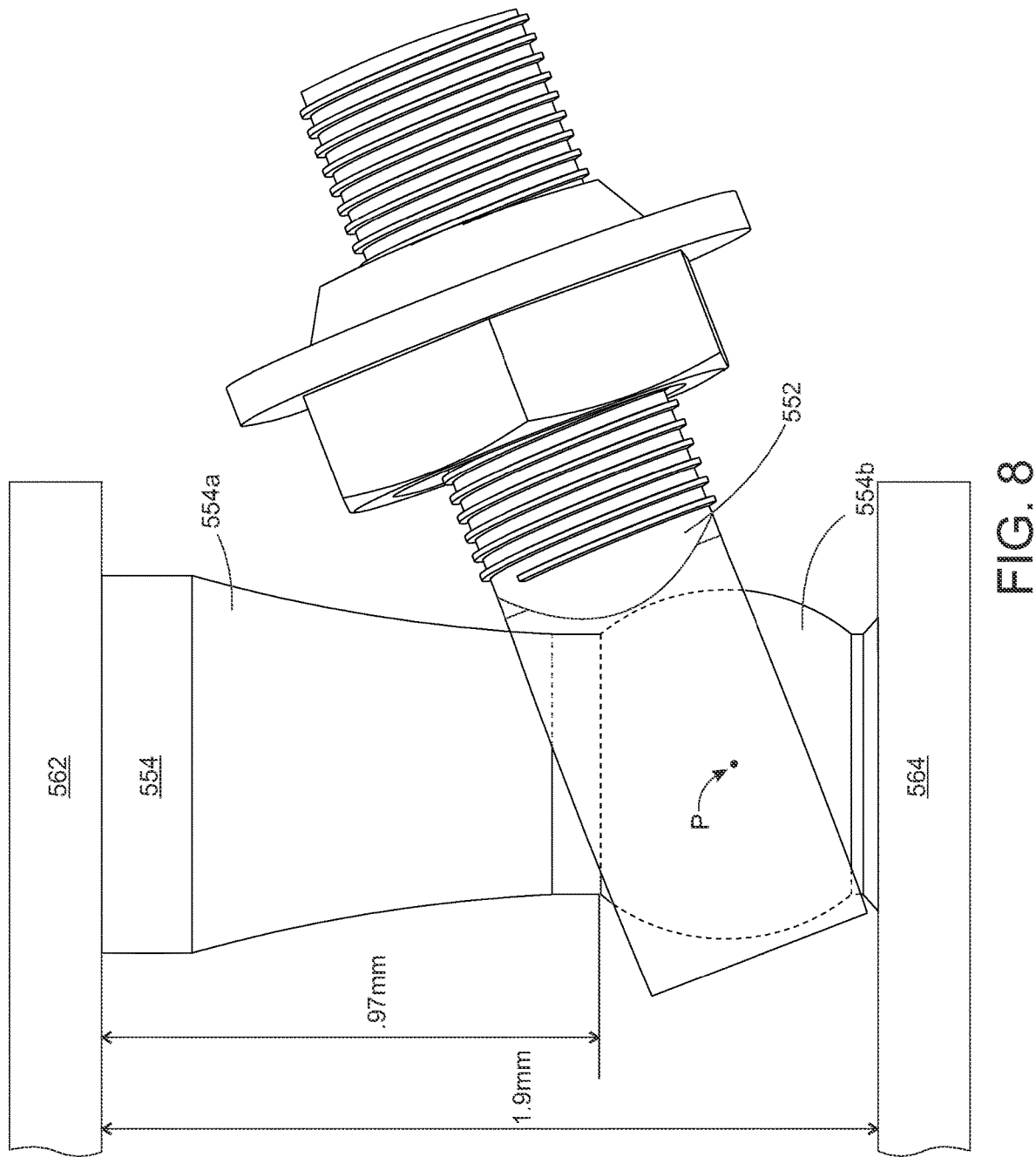
FIG. 8 is a side view of the tie rod connection with dimensions according to an embodiment of the present invention.

FIG. 8 illustrates a side view of the tie rod connection with dimensions added to show the structural relationship of the different tie rod components including the tie rod 552 and the pin member 554 with the neck portion 554a and ball portion 554b. The pivot axis "p" has been moved to below the midpoint of the pin member 554 as shown in FIG. 8.

Figure 9:
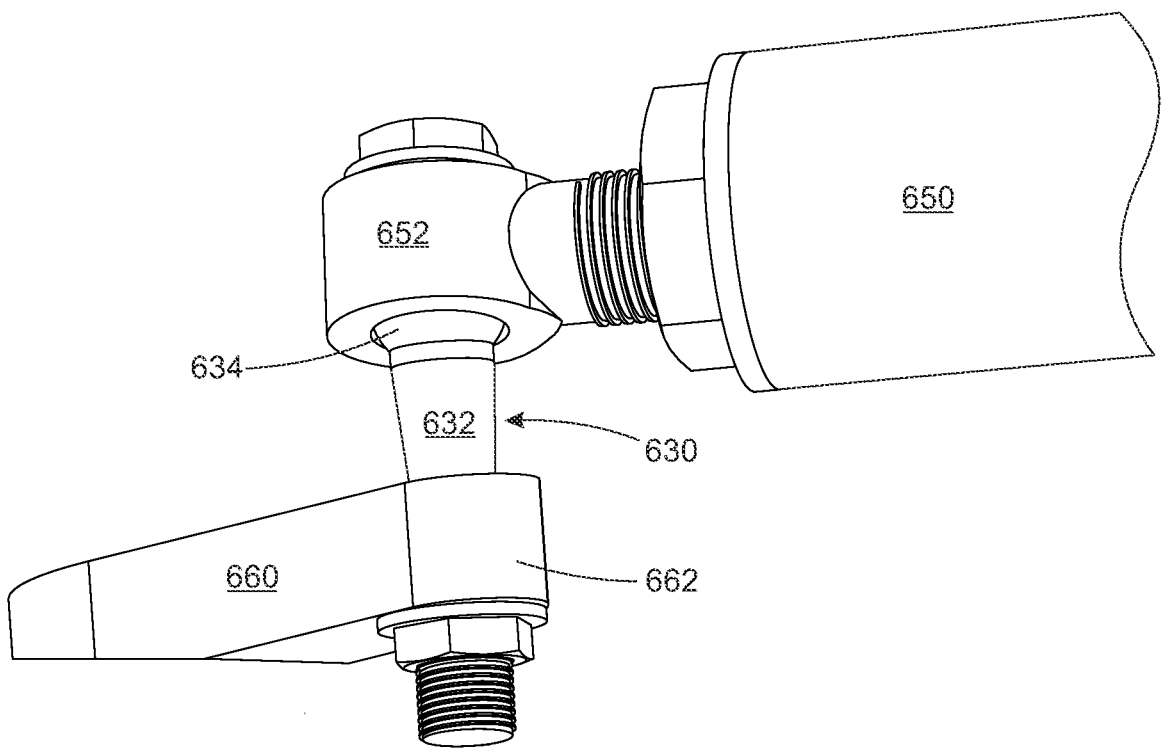
FIG. 9 is a partial side and tope perspective view of a wheel end assembly according to an alternate embodiment of the present invention.

With reference to FIG. 9, an alternate embodiment of the present invention where the wheel carrier 660 is designed with a single mounting extension or single shear 662. Again, the invention will focus on the pivoting connection section where the tie rod 650 is coupled to the wheel carrier 660 via a pin member 630; e.g., where the tie rod 650 is pivotally coupled to a single mounting extension 662 of a wheel carrier 660 (e.g., at outer joint 266 shown in FIG. 4). As shown in FIG. 9, the tie rod end 652 of the tie rod 650 connects to the ball portion 634 of the pin 630 at a point that is offset from the mounting extension 662 of the wheel carrier 660 as compared to the conventional arrangement of FIG. 5. Indeed, the pin member 630 is formed with a neck portion 632 that is elongated below the ball portion 634 as shown in FIG. 9 in such a manner that the tie rod end 652 is raised above the mounting extension 662 because, for this specific wheel end assembly, the bump steer is improved by raising the intersection point between the tie rod end 652 and the ball portion 634 of the pin member 554 to thereby place the tie rod 650 in a parallel arrangement with respect to the control arms. In the design of FIG. 9, the pin member 630 is modified to move the ball portion 634 away from the extension 662; i.e., offset from the midpoint of the in members 630.

Figure 10:
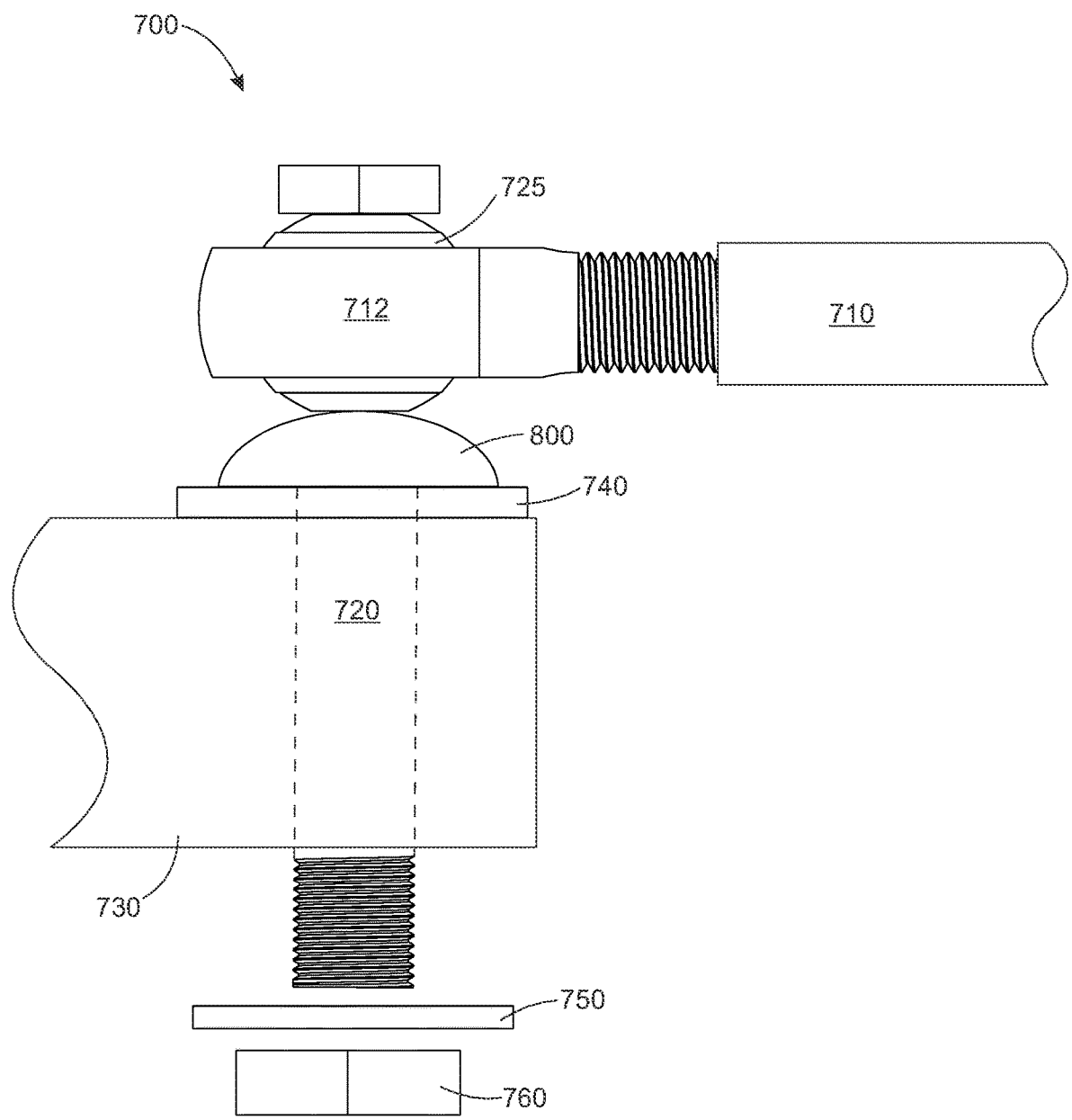
FIG. 10 is an exploded view of an adjustable height pin according to an alternate embodiment of the present invention.
Figure 11:
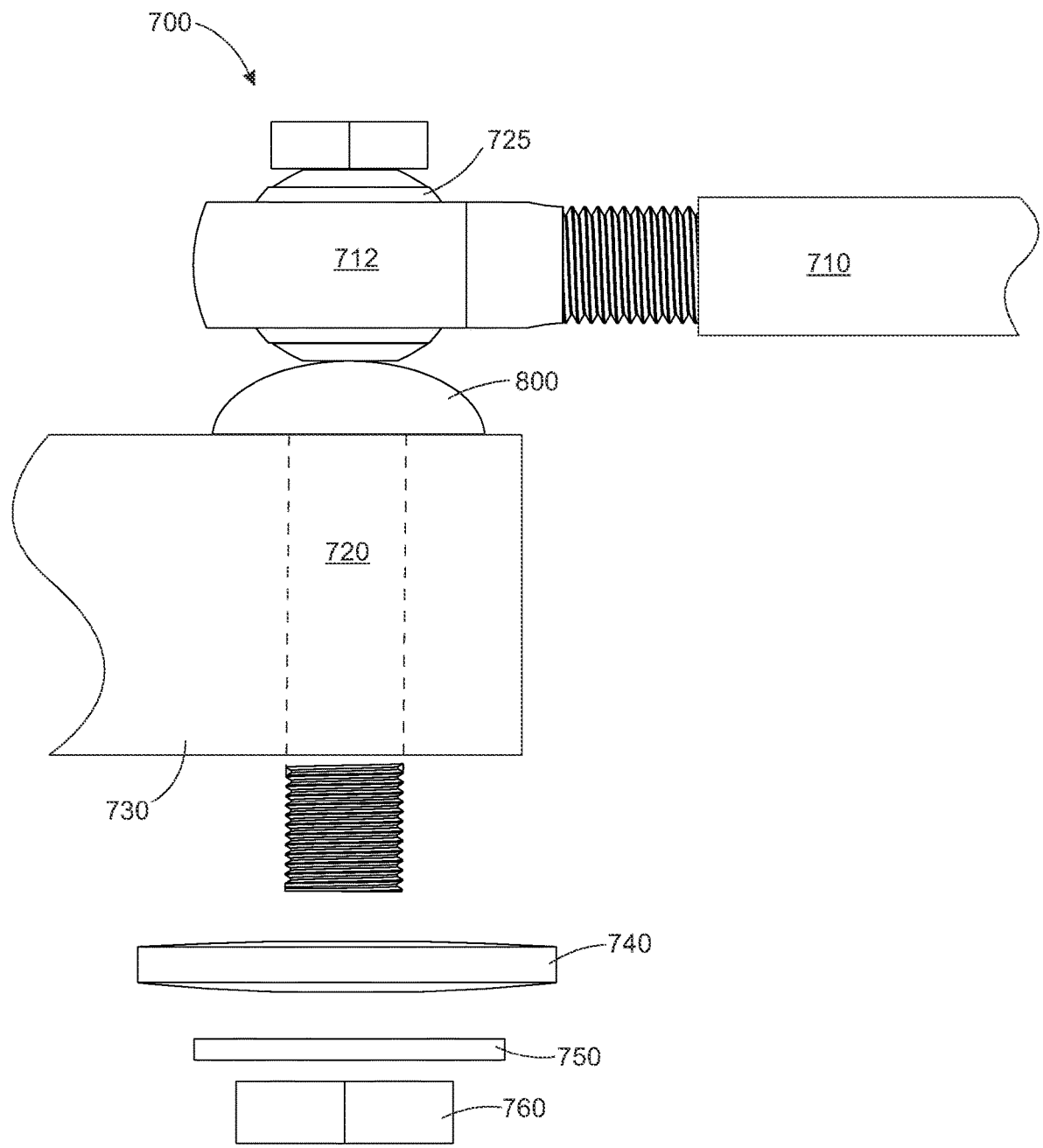
FIG. 11 is a partial exploded view of an adjustable height pin according to an alternate embodiment of the present invention.
Figure 12:
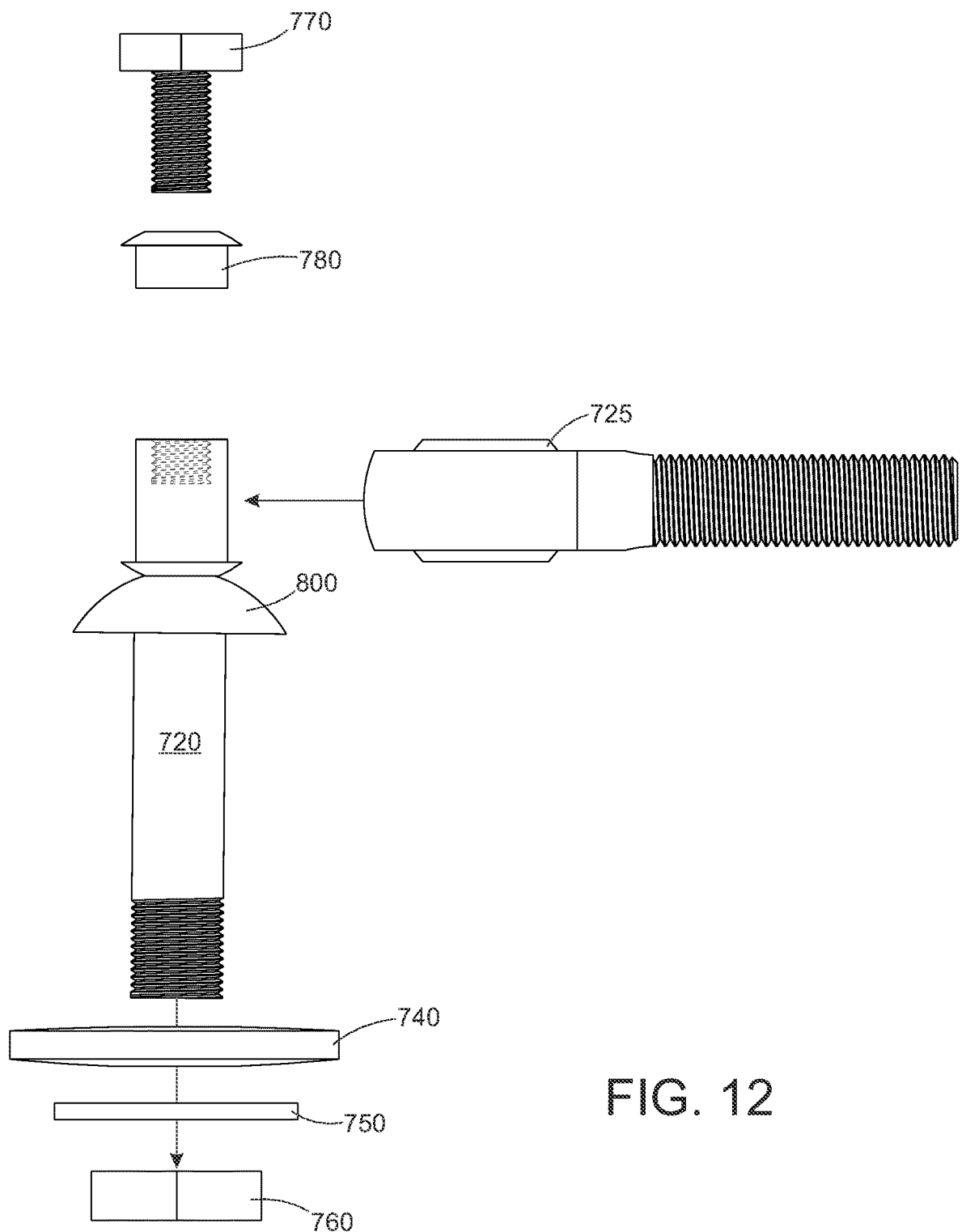
FIG. 12 is an exploded view of an adjustable height pin according to an alternate embodiment of the present invention.

With reference to FIGS. 10-12, an alternative embodiment of the present invention an adjustable height pin for a steering tie rod is disclosed. The adjustable height pin allows adjustment of the height on the tie rod. FIG. 10 shows a raised location and FIGS. 11 and 12 show a stock or lowered location.

In FIG. 10 the height between the spindle or upright tie rod mount and the tie rod is taller, i.e., the tie rod is further away from the upright tie rod mount as opposed to FIGS. 11 and 12. The at least one spacer in FIGS. 11 and 12 can be accessed when needed and used as the at least one spacer above the tie rod mount.

Tie rod connection assembly 700 includes a tie rod 710, a tie rod end 712, a ball portion 725, a pin (or stud) 720, at least one spacer 740, spindle or upright tie rod mount (or wheel carrier) 730, washer 750, threaded nut 760, bolt 770 and endcap 780. Pin member 720 has a frustoconical shoulder portion 800. In FIG. 10 the at least one spacer 740 is positioned below tie rod 710 between frustoconical shoulder portion 800 and tie rod mount 730. In FIGS. 11 and 12 the at least one spacer is positioned below tie rod mount 730. FIG. 10 is in the tall position with added height and FIGS. 11 and 12 are in the short position with no added height. FIG. 12 is exploded view of the short position.

Referring to FIGS. 11 and 12, nut 760 may be unscrewed to remove washer 750 and the at least one spacer 740 to remove pin 720 from tie rod mount 730. The at least one spacer 740 may be placed onto pin 720 and moved axially along pin 720 to about the frustoconical shoulder portion 800. The pin 720 with the at least one spacer 740 is then inserted into tie rod mount 730. Pin 720 is secured within tie rod mount 730 with washer 750 and threaded nut 760. The at least one spacer is now positioned as in FIG. 10. It is envisioned to have multiple spacers secured to the top portion of the pin above the tie rod mount and/or secured to the lower portion of the pin below the tie rod mount for adjustment of height.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the spirit and scope of the invention and the following claims.

By way of example, included throughout this specification are the dimensions of the various components of a preferred embodiment of the invention. The invention is not to be limited to the dimensions and specific configuration of the individual components, but rather, other dimensions and configurations that allow a suspension to be modified to improve bump steer by raising or lowering the pivot point at the tie rod connection outer end are envisioned by this invention.

The invention claimed is:

1. A method of height adjustment on a tie rod comprising:
   unscrewing a threaded nut of a tie rod assembly, the tie rod assembly comprising
   a tie rod;
   a tie rod mount;
   a washer;
   the threaded nut;
   a pin member affixed to the tie rod mount and pivotally coupled to the tie rod, said pin member comprising a first end, a second end and a frustoconical shoulder portion between said first and second ends; and
   at least one spacer positioned below the tie rod mount;
   removing the washer and the at least one spacer to remove the pin member from the tie rod mount; placing the at least one spacer onto the pin member;
   moving the at least one spacer axially along the pin member to about the frustoconical shoulder portion, wherein the at least one spacer is positioned above the tie rod mount;
   inserting the pin member with the at least one spacer into the tie rod mount; and
   securing the pin within the tie rod mount with the washer and the threaded nut.

2. The method of claim 1, comprising multiple spacers.

* * * * *